United States Patent
Kishida

(10) Patent No.: US 9,340,209 B2
(45) Date of Patent: May 17, 2016

(54) HIGH-VOLTAGE SYSTEM CONTROL DEVICE FOR VEHICLE

(71) Applicant: FUJI JUKOGYO KABUSHIKI KAISHA, Tokyo (JP)

(72) Inventor: Taichi Kishida, Tokyo (JP)

(73) Assignee: FUJI JUKOGYO KABUSHIKI KAISHA, Tokyo (JP)

(*) Notice: Subject to any disclaimer, the term of this patent is extended or adjusted under 35 U.S.C. 154(b) by 86 days.

(21) Appl. No.: 14/226,254

(22) Filed: Mar. 26, 2014

(65) Prior Publication Data

US 2014/0297152 A1  Oct. 2, 2014

(30) Foreign Application Priority Data

Mar. 27, 2013 (JP) ................................ 2013-066057

(51) Int. Cl.
*B60L 3/04*  (2006.01)
*B60W 30/16*  (2012.01)
(Continued)

(52) U.S. Cl.
CPC .............. *B60W 30/16* (2013.01); *B60L 3/0007* (2013.01); *B60L 3/0015* (2013.01); *B60L 3/04* (2013.01); *B60L 7/14* (2013.01); *B60L 7/26* (2013.01); *B60L 15/2009* (2013.01); *B60W 10/06* (2013.01); *B60W 10/08* (2013.01); *B60W 10/11* (2013.01); *B60W 10/184* (2013.01); *B60W 30/00* (2013.01); *B60W 30/085* (2013.01); *B60W 30/09* (2013.01); *B60W 30/14* (2013.01); *B60W 50/14* (2013.01); *B60L 2240/423* (2013.01); *B60L 2240/62* (2013.01); *B60L 2240/68* (2013.01); *B60L 2260/44* (2013.01); *B60W 20/00* (2013.01); *B60W 2040/0818* (2013.01);

(Continued)

(58) Field of Classification Search
CPC ..... B60W 30/16; B60W 10/06; B60W 10/11; B60W 30/085; B60W 10/08; B60W 10/184; B60W 30/00; B60W 30/09; B60W 50/14; B60W 30/14; B60W 2710/083; B60W 2710/182; B60W 2520/10; B60W 2710/0666; B60W 2710/106; B60L 3/04
See application file for complete search history.

(56) References Cited

U.S. PATENT DOCUMENTS

2009/0267412 A1  10/2009  Kitanaka
2014/0088803 A1*  3/2014  Heap et al. ...................... 701/22

FOREIGN PATENT DOCUMENTS

JP  07-227002 A  8/1995
JP  08-237815 A  9/1996
(Continued)

OTHER PUBLICATIONS

Machine translation of JP2010-183676.*

*Primary Examiner* — John Q Nguyen
*Assistant Examiner* — Michael Kerrigan
(74) *Attorney, Agent, or Firm* — McDermott Will & Emery LLP

(57) ABSTRACT

A high-voltage system control device is used for a vehicle provided with a high-voltage system including a motor as a power source and a battery to supply electric power to the motor. The device includes: an inter-vehicle distance detection unit to detect an inter-vehicle distance between the vehicle and an target such as a preceding vehicle; an automatic brake to automatically brake the vehicle according to the inter-vehicle distance; and a cut-off control unit to cut off the high-voltage system when the automatic brake is activated. When the vehicle is traveling at a high vehicle speed and the automatic brake is activated, the high-voltage system is cut off with a main relay.

12 Claims, 3 Drawing Sheets

(51) Int. Cl.
| | |
|---|---|
| *B60W 50/14* | (2012.01) |
| *B60W 30/00* | (2006.01) |
| *B60W 30/09* | (2012.01) |
| *B60W 30/14* | (2006.01) |
| *B60W 10/06* | (2006.01) |
| *B60W 10/08* | (2006.01) |
| *B60W 10/11* | (2012.01) |
| *B60W 10/184* | (2012.01) |
| *B60W 30/085* | (2012.01) |
| *B60L 3/00* | (2006.01) |
| *B60L 7/14* | (2006.01) |
| *B60L 7/26* | (2006.01) |
| *B60L 15/20* | (2006.01) |
| *B60W 40/08* | (2012.01) |
| *B60W 20/00* | (2016.01) |

(52) U.S. Cl.
CPC ....... *B60W 2520/10* (2013.01); *B60W 2540/00* (2013.01); *B60W 2540/10* (2013.01); *B60W 2540/18* (2013.01); *B60W 2710/0666* (2013.01); *B60W 2710/083* (2013.01); *B60W 2710/1005* (2013.01); *B60W 2710/1066* (2013.01); *B60W 2710/182* (2013.01); *Y02T 10/6286* (2013.01)

(56) References Cited

FOREIGN PATENT DOCUMENTS

| | | | |
|---|---|---|---|
| JP | 2005-020952 A | 1/2005 | |
| JP | 2006-020450 A | 1/2006 | |
| JP | 2006-141158 A | 6/2006 | |
| JP | 2006-143141 A | 6/2006 | |
| JP | 2007-129827 A | 5/2007 | |
| JP | 2010-183676 * | 3/2009 | ............... B60L 3/04 |
| JP | 2012-070561 A | 4/2012 | |
| JP | 2013-051755 A | 3/2013 | |
| WO | 2008/010281 A | 1/2008 | |

\* cited by examiner

HIGH-VOLTAGE SYSTEM CONTROL DEVICE FOR VEHICLE

CROSS-REFERENCE TO RELATED APPLICATIONS

The present application claims priority from Japanese Patent Application No. 2013-066057 filed on Mar. 27, 2013, the entire contents of which are hereby incorporated by reference.

BACKGROUND

1. Technical Field

The present invention relates to a high-voltage system control device for a vehicle that controls a high-voltage system provided to a vehicle with an electric motor.

2. Related Art

There are two types of vehicles having an electric motor as a power source: in a narrow-definition, electric vehicle (EV) including only an electric motor as a power source; and in a broad definition, a hybrid vehicle (HEV) including an electric motor and an internal-combustion engine as power sources. In these vehicles, the electric motor is connected to a battery such as a rechargeable battery via an inverter and the section from the battery to the electric motor constitutes a high-voltage system. When the vehicle is crashed into a preceding vehicle or an obstacle, an air-bag is activated to protect a passenger. Further, since the crash may damage the battery in a high-voltage state leading to electrical shock due to a leakage of, the high-voltage system is automatically cut off upon the detection of a crash, in other words, an automatic disconnection is performed.

Japanese Unexamined Patent Application Publication (JP-A) No. 2005-20952 discloses a hybrid vehicle which turns off a main relay of a system when a crash prediction signal is received. JP-A No. 2006-20450 discloses a control device of a hybrid vehicle which turns off a strong electric relay when the vehicle is crashed or a crash is predicted.

JP-A No. 2006-143141 discloses a high-voltage cut-off system of a hybrid vehicle which is disconnects an electric connection between a high-voltage battery and an inverter when a crash is predicted. JP-A No. 2007-129827 discloses a brake assist system which performs regenerative braking by a motor when entering a range requiring a pre-crash brake after a crash is predicted. In this brake assist system, when a possibility of a crash is determined, a drive force distribution ratio to a motor is set higher than a drive force distribution ratio to an engine. When the vehicle is determined to enter a range requiring the brake activation, regenerative braking force is generated by the motor.

When a vehicle is provided with an inter-vehicle distance detection unit, an inter-vehicle distance between the vehicle and a preceding vehicle or an obstacle can be detected. In a vehicle with an automatic brake, which automatically activates a brake, in addition to the inter-vehicle distance detection unit, a pre-crash control which automatically activates the brake can be performed by predicting a crash according to the inter-vehicle distance. By performing the pre-crash control, even when there is a preceding vehicle or an obstacle in front of the vehicle, a crash can be avoided by automatically activating the brake and damage of a crash can be reduced.

However, as described above, danger of a high-voltage system may not be sufficiently avoided when the high-voltage system is cut off after a crash is detected.

SUMMARY OF THE INVENTION

The present invention has an object to improve safety of the vehicle with a high-voltage system.

An aspect of the present invention provides a high-voltage system control device for a vehicle provided with a high-voltage system including a motor as a power source and a battery to supply electric power to the motor, the high-voltage system control device including: an inter-vehicle distance detection unit configured to detect an inter-vehicle distance between the vehicle and an target such as a preceding vehicle; an automatic brake configured to automatically brake the vehicle according to the inter-vehicle distance; and a cut-off control unit configured to cut off the high-voltage system when the automatic brake is activated.

DETAILED DESCRIPTION

Figure 1:
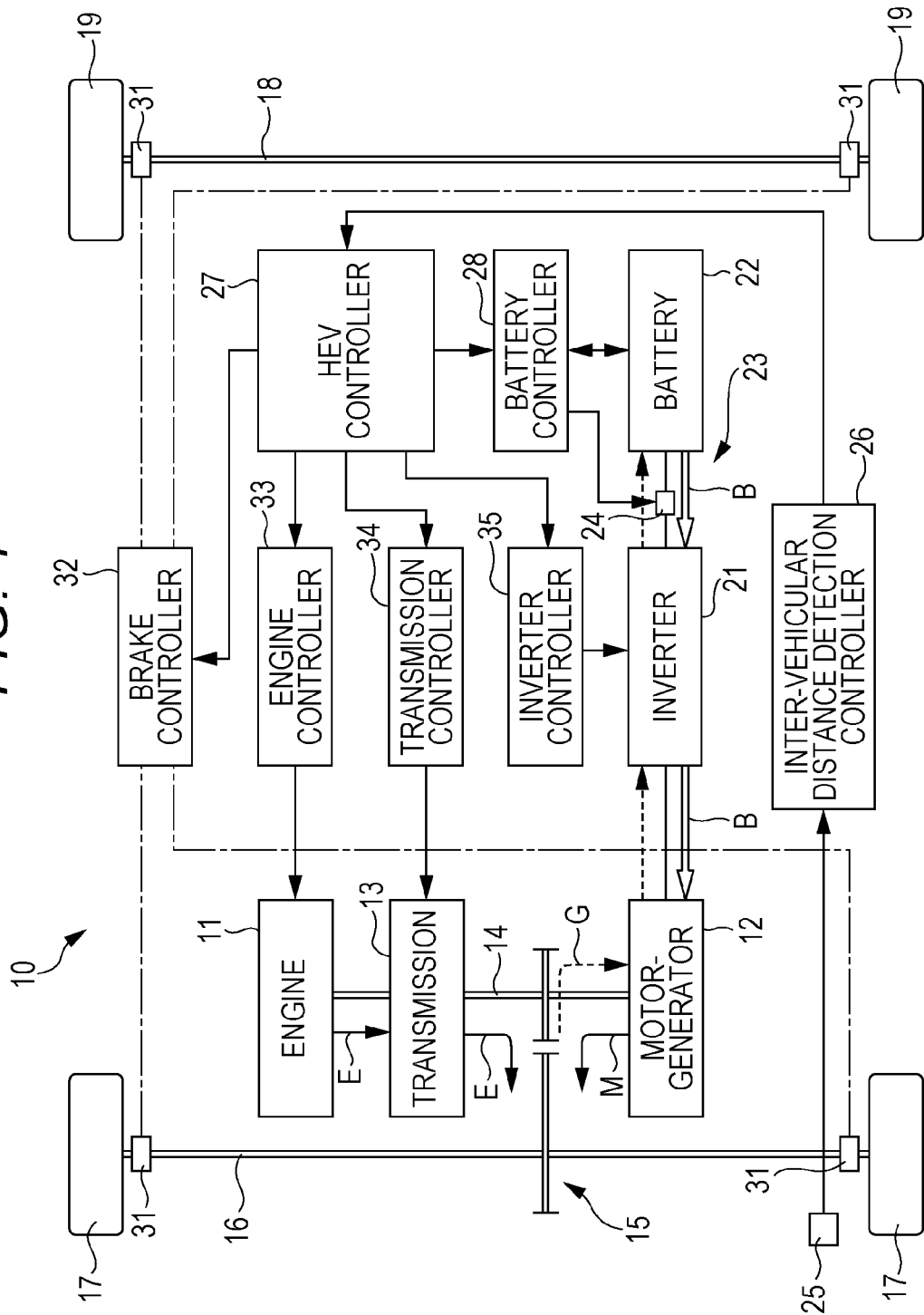
FIG. 1 is a diagrammatic diagram illustrating an example of a system configuration of a hybrid vehicle.

An implementation of the present invention will be explained in detail below with reference to the drawings. A vehicle 10 illustrated in FIG. 1 is a hybrid vehicle and has, respectively as power sources, an engine 11 which is an internal-combustion engine such as a gasoline engine and a diesel engine, and a motor-generator 12 which is a motor with an electric power generation function. An output shaft of the engine 11 is connected with a transmission 13, and the motor-generator 12 is connected with an output shaft 14 of the transmission 13. The output shaft 14 is connected to a front wheel axle 16 via a speed reduction gear pair 15. The vehicle 10 has an engine drivetrain for transferring power of the engine 11 to front wheels 17 as drive wheels and a motor drivetrain for transferring power of the motor-generator 12 to the drive wheels. To the front wheels 17 provided to the axle 16, at least either one of the power of the engine 11 and the power of the motor-generator 12 is transferred according to a travel mode. A rear wheel axle 18 is provided with rear wheels 19. The front wheel axle 16 is provided a differential gear, which is not illustrated in FIG. 1.

An inverter 21 is connected to a stator of the motor-generator 12. A battery 22 which is an energy storage device is connected to the inverter 21, via a power distribution line. The section from the battery 22 to the motor-generator 12 constitutes a high-voltage system 23, and a main relay 24, that is a contact of the high-voltage system, is provided to the power distribution line between the battery 22 and the inverter 21. In this vehicle 10, power from the engine 11 is transferred to the front wheels 17 as indicated by arrows E, electric power from the battery 22 is supplied to the motor-generator 12 as indicated by arrows B, and power from the motor-generator 12 is transferred to the front wheels 17 as indicated by arrows M. With this configuration, the vehicle 10 can be driven by using, as a power source, at least one of the engine 11 and the motor-generator 12.

The motor-generator 12 functions as an electricity generator when a vehicle speed is reduced, whereby the travel mode is switched to a regenerative braking mode in which braking energy discarded as thermal energy upon braking is absorbed and upon in the battery 22, as indicated by dashed arrows G.

The vehicle 10 has an inter-vehicle distance detector 25 for detecting an inter-vehicle distance between the vehicle 10 and an obstacle or a preceding vehicle. The inter-vehicle distance detector 25 is configured with, for example, with two CCD cameras for detecting the distance to the obstacle or preceding vehicle as the target based on left and right parallax. Alternatively, the inter-vehicle distance detector 25 may be configured with a millimeter-wave radar for detecting the distance. Regarding a detection sensor signal from the inter-vehicle distance detector 25, the inter-vehicle distance between the vehicle and the target such as a preceding vehicle is detected based on the detection sensor signal in an inter-vehicle distance detection controller 26 serving the an inter-vehicle distance detection unit of the present invention. The signal of the detected inter-vehicle distance is sent to an HEV controller 27 serving as the cut-off control unit of the present invention. A battery controller 28 is connected with the HEV controller 27, and controls the main relay 24 to be in either one of a connecting state and a connection releasing state based on a signal from the HEV controller 27.

The front wheels 17 and the rear wheels 19 are each provided with an automatic brake 31 to apply braking force to the vehicle 10. The automatic brake 31 has a hydraulic actuator. The operation of the hydraulic actuator is controlled by a brake controller 32. A foot-operated brake is also provided in the vehicle 10, which is not illustrated in FIG. 1. The HEV controller 27 transmits a control signal to an engine controller 33 which controls the engine 11 so that output torque of the engine 11 is controlled. Further, the HEV controller 27 outputs a shift command signal to a transmission controller 34 which controls the transmission 13, and the HEV controller 27 also outputs a command signal of output torque of the motor-generator 12 to an inverter controller 35 which controls the inverter 21. The above various controllers including the HEV controller 27 are composed of a microcomputer having a central processing unit (CPU), a memory (ROM, RAM) and an input-output interface.

As illustrated in FIG. 1, the vehicle 10 includes the automatic brakes 31 and the inter-vehicle distance detector 25, which detects an inter-vehicle distance between the vehicle and a target such as a preceding vehicle. When the inter-vehicle distance between the vehicle and the target becomes equal to or smaller than a predetermined pre-crash control distance, a pre-crash control is executed to activate the automatic brakes 31 to automatically brake the vehicle 10.

Figure 2A:
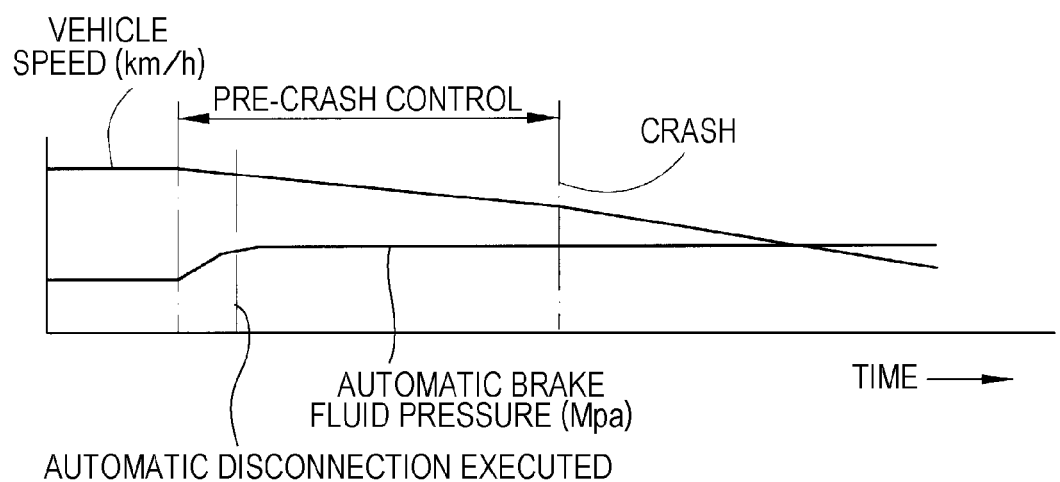
FIG. 2A is a timing diagram illustrating a cut-off control of a high-voltage system according to an implementation of the present invention during a pre-crash control.
Figure 2B:
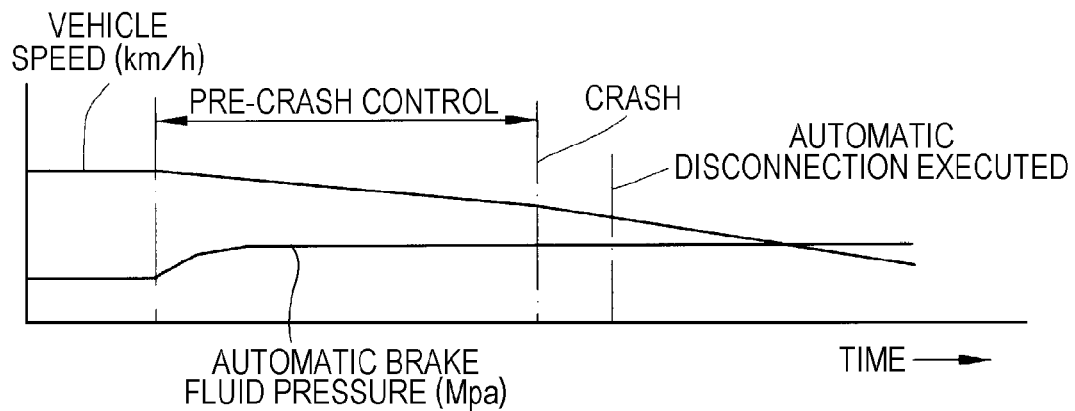
FIG. 2B is a timing diagram illustrating a cut-off control of a conventional high-voltage system given as a comparative example.

FIG. 2A is a timing diagram illustrating a cut-off control of the high-voltage system according to an implementation of the present invention during the pre-crash control; and FIG. 2B is a timing diagram illustrating a cut-off control of a conventional high-voltage system given as a comparative example.

As illustrated in FIG. 2A, the automatic brakes 31 are activated and the pre-crash control is executed not to crash the vehicle into the target. When a brake fluid pressure of the automatic brake 31 becomes greater than a predetermined threshold value, the HEV controller 27 outputs a cut-off signal to the battery controller 28. Accordingly, the battery controller 28 outputs a connection-release signal to the main relay 24 and an automatic disconnection is executed. When the pre-crash control is executed, the vehicle 10 is caused to stop without being crashed into the target such as a preceding vehicle. Even if the vehicle 10 is crashed into the target, the main relay 24 has been already turned off by the automatic disconnection based on the activation of the automatic brake 31. In this manner, since the high-voltage system 23 is cut off by the turning-off of the main relay 24, danger of the high-voltage system can surely be avoided even at the crash of the vehicle 10 into the object.

The automatic disconnection is particularly executed when the pre-crash control is executed in a condition that the vehicle is traveling at a high vehicle speed greater than a predetermined cut-off speed. The cut-off speed is, for example, set to a vehicle speed greater than 30 km/h. When the vehicle 10 is traveling at such a high speed and the pre-crash control is executed in a condition that, a crash is more likely to occur than in the case that the pre-crash control is executed at a lower vehicle speed. Thus, the automatic disconnection is performed when the vehicle 10 is traveling at a speed greater than the predetermined cut-off speed and the pre-crash control is executed. Note that the cut-off speed is not limited to 30 km/he and may be set to any vehicle speed.

As illustrated as the comparative example in FIG. 2B, conventionally, when it is detected that the vehicle has crashed into an object such as a preceding vehicle, an air-bag is activated as well as an automatic disconnection is performed. Thus, danger of a high-voltage system is expected because the automatic disconnection is executed after the crash. In the implementation, on the other hand, the automatic disconnection is executed based on an activation of the automatic brake 31, the danger of the high-voltage system can be avoided.

When the automatic disconnection is executed, a shock is generated in the vehicle in a condition that drive torque of the motor-generator 12 is being transferred to the drive wheels. Thus, a zero torque control which reduces target torque of the motor-generator 12 to zero is performed so as to prevent axial torque from being generated to the motor-generator 12 during the period between the execution of the pre-crash control and the execution of the automatic disconnection. The zero torque control is performed based on the command signal sent from the HEV controller 27 to the inverter controller 35. In addition to the zero torque control, engine torque is adjusted to reduce a gap from the driver's request torque. The reduction in the gap is achieved by, for example, adjusting a transmission gear ratio of the transmission 13. Alternatively, both the engine torque the transmission gear ratio may be adjusted.

Figure 3:
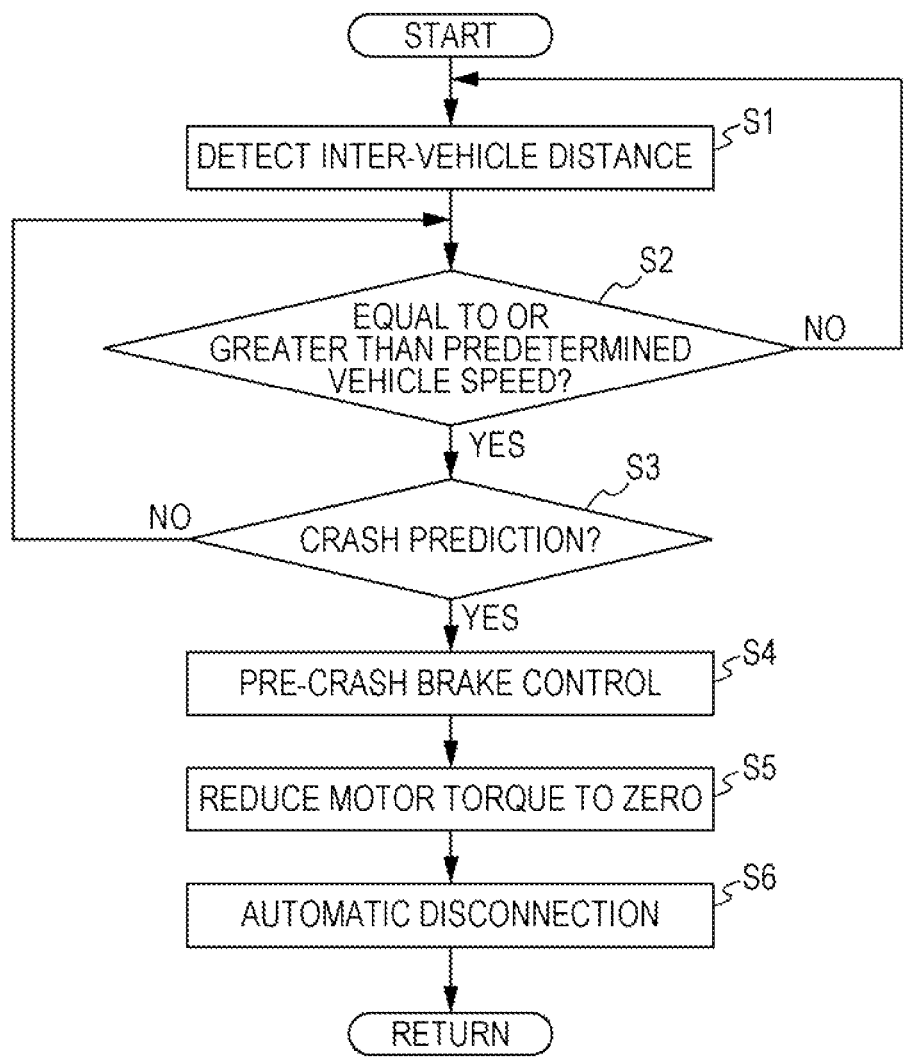
FIG. 3 is a flowchart illustrating an algorithm of the cut-off control according to the implementation of the present invention.

FIG. 3 is a flowchart illustrating an algorithm of the cut-off control. When the vehicle 10 is traveling, the inter-vehicle distance detection controller 26 detects an inter-vehicle distance between the vehicle and the target such as a preceding vehicle or an obstacle based on a signal from the inter-vehicle distance detector 25 (step S1). When it is determined in step S2 that the vehicle speed is greater than the predetermined cut-off speed, and the inter-vehicle distance between the vehicle and the target decreases so as to be equal to or less than a predetermined value and the vehicle 10 approaches to the target, a crash prediction is performed in step S3. When a crash is predicted, the pre-crash control is executed as illustrated in FIG. 2A (step S4). When the pre-crash control is performed, the automatic brake 31 is activated by a control signal from the brake controller 32 and braking force is applied to the vehicle 10.

When the fluid-pressure of the automatic brake 31 becomes greater than a threshold value, the motor torque is firstly reduced to zero in step S5. Then, the automatic disconnection is executed to turn off the main relay 24 in step S6. In this manner, when the zero torque control is performed to cut off the high-voltage system 23, the gap from the driver's request torque is made small upon the pre-crash control, and, further, safety of the high-voltage system 23 is ensured even if the vehicle is crashed.

The pre-crash control is also executed when the vehicle approaches to the target at a low vehicle speed. As described above, the automatic disconnection is performed based on the activation of the automatic brakes 31 when the pre-crash control is executed at the high vehicle speed, thereby avoiding danger of the high-voltage system in a travel condition with a higher possibility of a crash compared to a low vehicle speed condition.

When the vehicle 10 is not crashed into the target due to the pre-crash control, stopping just before the target, the main relay 24 is switched to a connecting state according to a stop signal of the vehicle 10. This switching operation may be performed with a manually-operated switch.

The present invention is not limited to the aforesaid implementation, and various modifications are possible without departing from the scope of the present invention. For example, the vehicle 10 illustrated in FIG. 1 is a hybrid vehicle including the engine 11 and the motor-generator 12 as power sources. Alternatively, the present invention can be applied to a vehicle including only an electric motor as a power source.

The invention claimed is:

1. A high-voltage system control device for a vehicle provided with a high-voltage system including a motor as a power source and a battery to supply electric power to the motor, the high-voltage system control device comprising:
   an inter-vehicle distance detection unit configured to detect an inter-vehicle distance between the vehicle and a target including a preceding vehicle;
   an automatic brake configured to automatically brake the vehicle according to the inter-vehicle distance;
   a cut-off control unit configured to cut off the high-voltage system in response to activation of the automatic brake;
   an inverter coupled to the motor in the high-voltage system; and
   an inverter controller configured to control the inverter,
   the inverter controller being configured to, after the automatic brake is activated and before the vehicle is crashed with the target, perform a zero torque control to reduce target torque of the motor to zero before the high-voltage system is cut off.

2. The high-voltage system control device for a vehicle according to claim 1, wherein the high-voltage system is cut off when the vehicle is traveling at a high vehicle speed greater than a predetermined cut-off speed and the automatic brake is activated.

3. The high-voltage system control device for a vehicle according to claim 2, further comprising a main relay configured to cut off the high-voltage system, the main relay provided between the battery and the inverter.

4. The high-voltage system control device for a vehicle according to claim 3, wherein the motor and the engine are used as power sources and engine torque is adjusted when performing the zero torque control.

5. The high-voltage system control device for a vehicle according to claim 4, wherein a transmission is disposed between the engine and a drive wheel, and a transmission gear ratio is adjusted when performing the zero torque control.

6. The high-voltage system control device for a vehicle according to claim 2, wherein the motor and the engine are used as power sources and engine torque is adjusted when performing the zero torque control.

7. The high-voltage system control device for a vehicle according to claim 6, wherein a transmission is disposed between the engine and a drive wheel, and a transmission gear ratio is adjusted when performing the zero torque control.

8. The high-voltage system control device for a vehicle according to claim 1, further comprising a main relay configured to cut off the high-voltage system, the main relay provided between the battery and the inverter.

9. The high-voltage system control device for a vehicle according to claim 8, wherein the motor and the engine are used as power sources and engine torque is adjusted when performing the zero torque control.

10. The high-voltage system control device for a vehicle according to claim 9, wherein a transmission is disposed between the engine and a drive wheel, and a transmission gear ratio is adjusted when performing the zero torque control.

11. The high-voltage system control device for a vehicle according to claim 1, wherein the motor and the engine are used as power sources and engine torque is adjusted when performing the zero torque control.

12. The high-voltage system control device for a vehicle according to claim 11, wherein a transmission is disposed between the engine and a drive wheel, and a transmission gear ratio is adjusted when performing the zero torque control.

* * * * *